United States Patent
Sasaki et al.

(10) Patent No.: US 8,957,383 B2
(45) Date of Patent: Feb. 17, 2015

(54) RADIATION DETECTION APPARATUS AND RADIATION DETECTION SYSTEM

(71) Applicant: Canon Kabushiki Kaisha, Tokyo (JP)

(72) Inventors: Yoshito Sasaki, Kumagaya (JP); Satoshi Okada, Tokyo (JP); Yohei Ishida, Honjo (JP); Tomoaki Ichimura, Kitamoto (JP); Masato Inoue, Kumagaya (JP); Takamasa Ishii, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/044,149

(22) Filed: Oct. 2, 2013

(65) Prior Publication Data

US 2014/0103216 A1    Apr. 17, 2014

(30) Foreign Application Priority Data

Oct. 11, 2012  (JP) ................. 2012-226326

(51) Int. Cl.
  *G01T 1/20*    (2006.01)
  *G01T 1/202*   (2006.01)
(52) U.S. Cl.
  CPC .. *G01T 1/20* (2013.01); *G01T 1/202* (2013.01)
  USPC .................................................. 250/361 R
(58) Field of Classification Search
  USPC .................................................. 250/361 R
  See application file for complete search history.

(56) References Cited

U.S. PATENT DOCUMENTS

| | | | | |
|---|---|---|---|---|
| 5,023,461 A * | 6/1991 | Nakazawa et al. | ......... | 250/484.4 |
| 6,121,620 A * | 9/2000 | Tashiro et al. | ........... | 250/370.11 |
| 7,126,130 B2 * | 10/2006 | Hennessy et al. | ........ | 250/370.11 |
| 7,256,404 B2 | 8/2007 | Inoue et al. | .............. | 250/370.11 |
| 7,402,814 B2 * | 7/2008 | Vieux et al. | .............. | 250/370.11 |
| 7,514,686 B2 | 4/2009 | Ogawa et al. | ................ | 250/361 |
| 7,595,493 B2 | 9/2009 | Okada et al. | .............. | 250/370.11 |
| 8,304,735 B2 | 11/2012 | Inoue et al. | ............. | 250/361 R |
| 8,653,465 B2 | 2/2014 | Nagano et al. | ................ | 250/369 |
| 2001/0045522 A1 * | 11/2001 | Homme et al. | ........... | 250/361 R |
| 2004/0124362 A1 * | 7/2004 | Hennessy et al. | ........ | 250/370.11 |
| 2004/0245474 A1 * | 12/2004 | Vieux et al. | .............. | 250/370.11 |
| 2005/0092927 A1 * | 5/2005 | Nagano | ..................... | 250/370.11 |
| 2006/0033031 A1 | 2/2006 | Takeda et al. | ............ | 250/370.11 |
| 2006/0033032 A1 * | 2/2006 | Inoue et al. | .............. | 250/370.11 |
| 2010/0181489 A1 * | 7/2010 | Okada | ..................... | 250/370.01 |

(Continued)

FOREIGN PATENT DOCUMENTS

| | | |
|---|---|---|
| JP | 2005-156545 | 6/2005 |
| JP | 2006-052986 | 2/2006 |

*Primary Examiner* — David J Makiya

*Assistant Examiner* — Taeho Jo

(74) *Attorney, Agent, or Firm* — Fitzpatrick, Cella, Harper & Scinto

(57) ABSTRACT

The present invention provides a radiation detection apparatus including a first substrate member, a second substrate member, and a sealing portion configured to bond an edge portion of the first substrate member to an edge portion of the substrate member, one of the first substrate member and the second substrate member being a sensor panel including photoelectric conversion elements and the other being a scintillator panel including a scintillator layer, and the sealing portion including a first sealing resin having a first elastic modulus, a second sealing resin having a second elastic modulus lower than the first elastic modulus, a stress reduction portion configured to reduce a stress that acts on the first sealing resin and the second sealing resin and having a third elastic modulus lower than the second elastic modulus.

11 Claims, 11 Drawing Sheets

(56) References Cited

U.S. PATENT DOCUMENTS

| | | | |
|---|---|---|---|
| 2011/0309258 A1* | 12/2011 | Ishida et al. | 250/369 |
| 2012/0112075 A1* | 5/2012 | Noda | 250/361 R |
| 2012/0223240 A1* | 9/2012 | Ichimura et al. | 250/369 |
| 2012/0267539 A1* | 10/2012 | Shinba et al. | 250/366 |
| 2012/0294425 A1* | 11/2012 | Nagata et al. | 378/70 |
| 2012/0318990 A1 | 12/2012 | Tsujii et al. | 250/366 |
| 2013/0187054 A1 | 7/2013 | Ishii et al. | 250/367 |
| 2013/0221198 A1 | 8/2013 | Sawada et al. | 250/208.1 |
| 2013/0307094 A1* | 11/2013 | Yoshiuchi et al. | 257/415 |
| 2013/0308755 A1* | 11/2013 | Ishida et al. | 378/62 |
| 2013/0322598 A1 | 12/2013 | Saruta et al. | 378/62 |
| 2014/0034836 A1 | 2/2014 | Takei et al. | 250/366 |

* cited by examiner

F I G. 5A
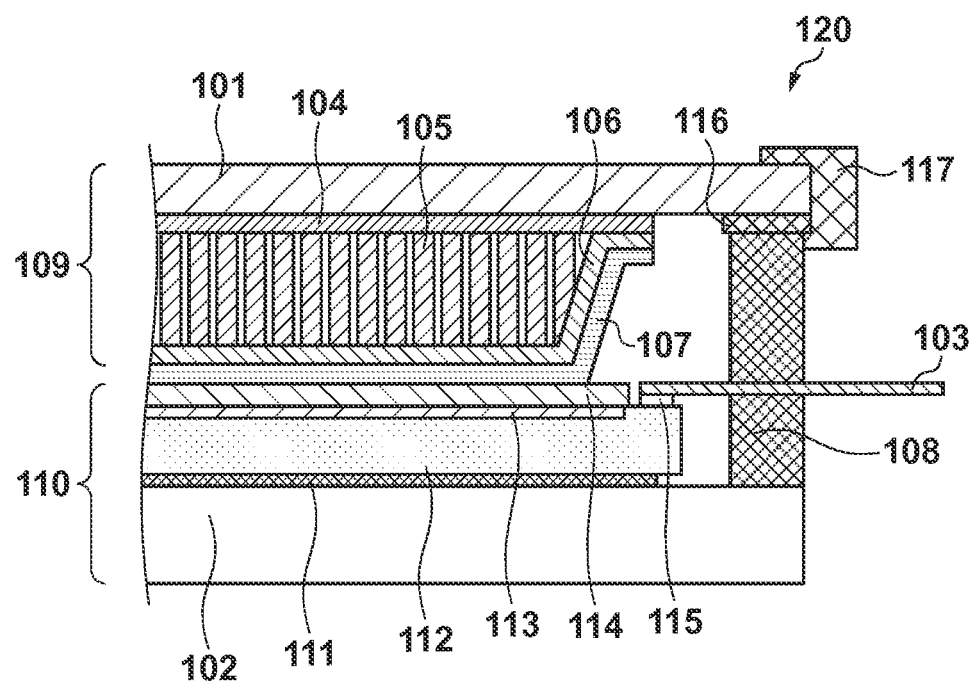
F I G. 5B
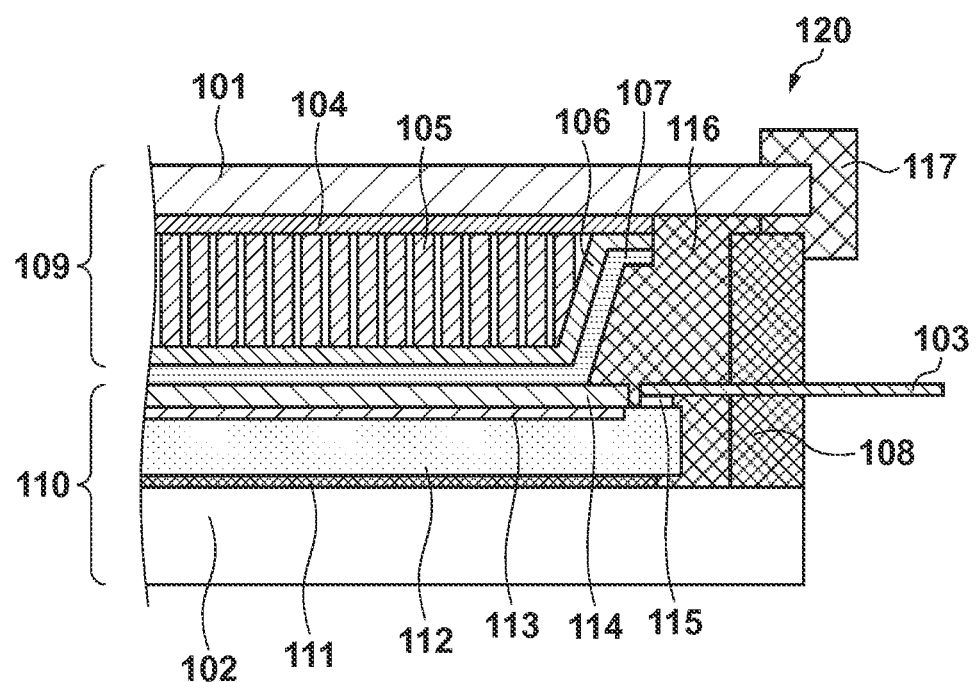

US 8,957,383 B2

RADIATION DETECTION APPARATUS AND RADIATION DETECTION SYSTEM

BACKGROUND OF THE INVENTION

1. Field of the Invention

The present invention relates to a radiation detection apparatus and a radiation detection system.

2. Description of the Related Art

In recent years, radiation detection apparatuses in which a scintillator (scintillator substrate) for converting radiation such as X-rays into light with a wavelength detectable by a photoelectric conversion element is stacked (arranged) on a sensor panel on which a plurality of photoelectric conversion elements are formed have been commercialized.

Japanese Patent Laid-Open Nos. 2006-52986 and 2005-156545 respectively propose a technique of, when a scintillator substrate and a sensor panel are adhered, sealing their periphery with a frame body made of a resin or two kinds of resins (sealing portions) in such radiation detection apparatus.

However, a sealing resin used for the conventional radiation detection apparatus may not be sufficient in terms of the moisture resistance (humidity resistance) of a scintillator depending on the material or arrangement of a scintillator protection layer for protecting a scintillator, or must be increased to ensure the moisture resistance.

To solve this problem, high moisture resistance may be obtained by using a resin having a high elastic modulus as a sealing resin. However, if a resin having a high elastic modulus is used to seal a sensor panel and a substrate such as a scintillator substrate, which have different thermal expansion coefficients, a thermal shock may cause the failure of the sealing resin. This is because a stress acts on the sealing resin due to a difference in thermal expansion between the scintillator substrate and the sensor panel.

SUMMARY OF THE INVENTION

The present invention provides a radiation detection apparatus which is advantageous in improving the moisture resistance of a scintillator layer and the strength of a sealing portion.

According to one aspect of the present invention, there is provided a radiation detection apparatus including a first substrate member, a second substrate member, and a sealing portion configured to bond an edge portion of the first substrate member to an edge portion of the substrate member, one of the first substrate member and the second substrate member being a sensor panel including photoelectric conversion elements and the other being a scintillator panel including a scintillator layer, and the sealing portion including a first sealing resin having a first elastic modulus, a second sealing resin having a second elastic modulus lower than the first elastic modulus, a stress reduction portion configured to reduce a stress that acts on the first sealing resin and the second sealing resin and having a third elastic modulus lower than the second elastic modulus, wherein the first sealing resin bonds the edge portion of the first substrate member to a first surface of the stress reduction portion on a side of the first substrate member, the stress reduction portion is bonded to the edge portion of the second substrate member via a second surface on an opposite side to the first surface, and the second sealing resin bonds the edge portion of the second substrate member to the first sealing resin to cover a side surface between the first surface and the second surface of the stress reduction portion.

Further features of the present invention will become apparent from the following description of exemplary embodiments with reference to the attached drawings.

BRIEF DESCRIPTION OF THE DRAWINGS

FIGS. 5A and 5B are views each showing the arrangement of the sealing portion of the radiation detection apparatus shown in FIGS. 1A and 1B.

DESCRIPTION OF THE EMBODIMENTS

Figure 1A:
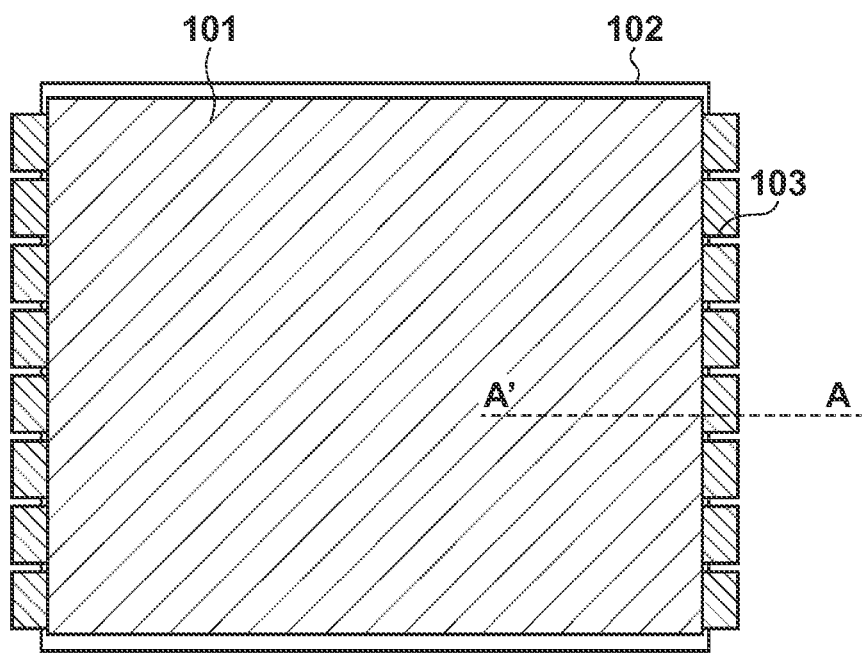
FIGS. 1A and 1B are views showing the arrangement of a radiation detection apparatus according to an aspect of the present invention.

Preferred embodiments of the present invention will be described below with reference to the accompanying drawings. Note that the same reference numerals denote the same members throughout the drawings, and a repetitive description thereof will not be given.

Figure 1B:
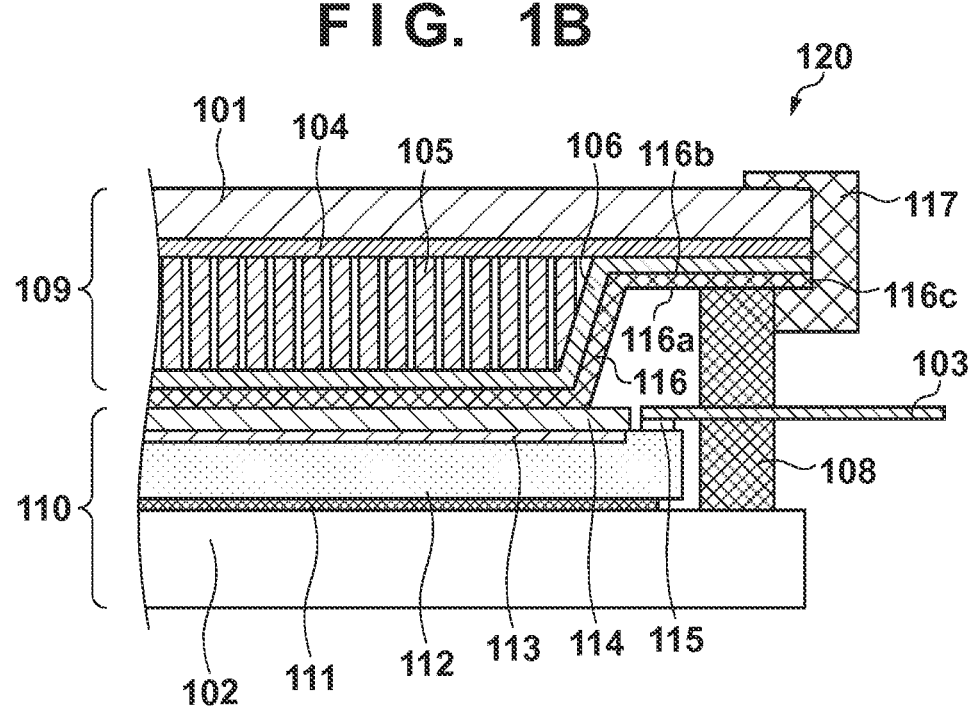

FIG. 1A is a schematic plan view showing the arrangement of a radiation detection apparatus 1 according to an aspect of the present invention. FIG. 1B is a cross-sectional view taken along a line A'-A of the radiation detection apparatus 1 shown in FIG. 1A. The radiation detection apparatus 1 includes photoelectric conversion elements and a scintillator layer for converting radiation into light with a wavelength detectable by the photoelectric conversion elements. The radiation includes not only X-rays but also electromagnetic waves such as α-rays, β-rays, and γ-rays. As shown in FIGS. 1A and 1B, the radiation detection apparatus 1 includes a scintillator panel (fluorescent screen) 109 as a first substrate member and a sensor panel (optical sensor or photoelectric conversion panel) 110 as a second substrate member, which are adhered to each other.

The sensor panel 110 will be explained first. The sensor panel 110 includes a sensor base 102, an adhesion layer 111, a sensor substrate 112, a photoelectric conversion portion 113, a sensor protection layer 114, and wiring leads 115.

Referring to FIG. 1B, the sensor substrate 112 is an insulating substrate adhered to the sensor base 102 by the adhesion layer 111 and is made of, for example, glass. The photoelectric conversion portion 113 in which photoelectric conversion elements and TFT switching elements (not shown) are two-dimensionally arrayed is arranged in the sensor substrate 112. The wiring leads 115 serve as bonding pad portions used to electrically connect external wiring lines 103 of an external flexible substrate or the like to the sensor substrate 112. The sensor protection layer 114 is arranged to cover the photoelectric conversion portion 113, and has a function of protecting the photoelectric conversion portion 113. The adhesion layer 111 adheres the sensor substrate 112 to the sensor base 102.

Figure 2:
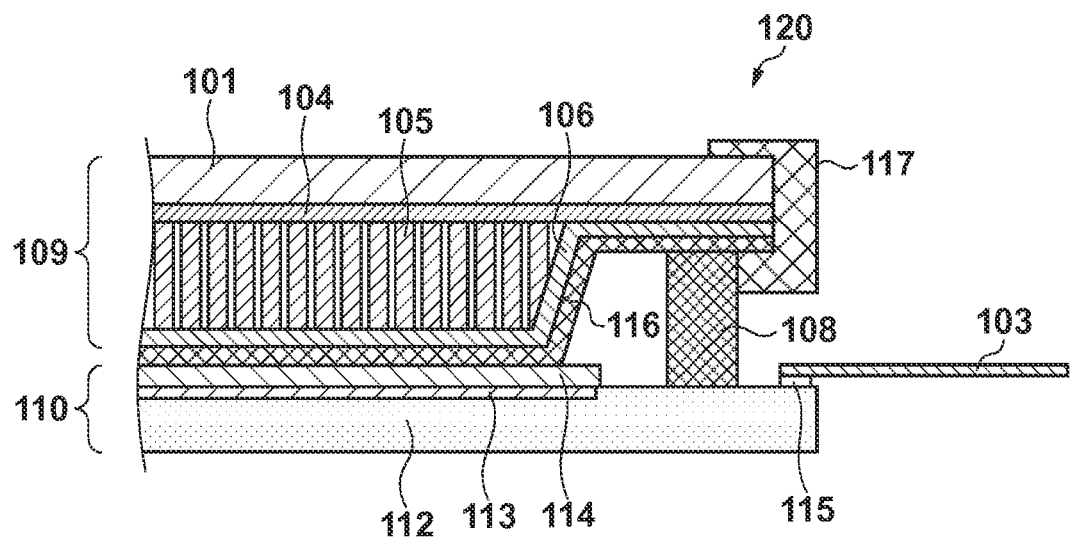
FIG. 2 is a view showing another arrangement of the sensor panel of the radiation detection apparatus shown in FIGS. 1A and 1B.

The sensor panel 110 may be formed by fixing the sensor substrate 112 to the sensor base 102 as shown in FIG. 1B or by arranging the photoelectric conversion portion 113 in the insulating sensor substrate 112 made of, for example, glass, as shown in FIG. 2. Alternatively, a sensor panel 110 in which a photoelectric conversion portion is arranged on an Si substrate may be used. In this case, a plurality of sensor panels 110 are fixed on a base.

The sensor protection layer 114 may be made of SiN, TiO$_2$, LiF, Al$_2$O$_3$, MgO, or the like. The sensor protection layer 114 may be made of a polyphenylene sulfide resin, fluororesin, polyether ether ketone resin, liquid crystal polymer, polyether nitrile resin, polysulfone resin, polyether sulfone resin, polyarylate resin, or the like. Alternatively, the sensor protection layer 114 may be made of a polyamide-imide resin, polyether-imide resin, polyimide resin, epoxy resin, silicone resin, or the like. Note that if the radiation detection apparatus 1 is irradiated with radiation, light converted by the scintillator layer 105 passes through the sensor protection layer 114. Therefore, the sensor protection layer 114 is preferably made of a material having high transparency with respect to the wavelength of the light converted by the scintillator layer 105.

The scintillator panel 109 will be described next. The scintillator panel 109 includes a scintillator base 101, a base protection layer 104, a scintillator layer 105, and a scintillator protection layer 106.

The scintillator base 101 is made of a material which has high transparency with respect to X-rays. The scintillator base 101 is made of, for example, at least one of beryllium (Be), magnesium (Mg), aluminum (Al), and an alloy containing beryllium, aluminum, or magnesium as a principal component. The scintillator layer 105 is arranged on the scintillator base 101 via the base protection layer 104. Furthermore, a reflection layer for effectively using the light converted by the scintillator layer 105 may be arranged on the scintillator base 101. Such reflection layer is made of a high reflectance material such as silver (Ag) or aluminum (Al). Note that if the scintillator base 101 is made of aluminum, it also functions as a reflection layer and thus no reflection layer needs to be arranged.

The scintillator layer 105 is made of, for example, a columnar crystal scintillator represented by cesium iodide doped with a trace amount of thallium (Tl) (CsI:Tl) or a particulate scintillator represented by gadolinium sulfate doped with a trace amount of terbium (Tb) (GOS:Tb). In this embodiment, the scintillator layer 105 is made of a columnar crystal scintillator containing cesium iodide as a principal component.

The scintillator protection layer 106 is arranged to cover the upper surface and side surface of the scintillator layer 105. The scintillator protection layer 106 has a function of protecting the scintillator layer 105 from moisture degradation (has moisture resistance or humidity resistance). Especially if the scintillator layer 105 is made of a columnar crystal scintillator such as CsI:Tl, the characteristics of the scintillator layer 105 suffers due to moisture degradation and thus the scintillator protection layer 106 is needed. As a material for the scintillator protection layer 106, for example, a general organic material such as a silicone resin, acrylic resin, or epoxy resin, or a hot-melt resin such as a polyester-based resin, polyolefin-based resin, or polyamide-based resin can be used. Note that it is preferable to use, as a material for the scintillator protection layer 106, a resin having low moisture permeability such as a poly-para-xylylene organic layer formed by CVD or a hot-melt resin represented by a polyolefin-based resin.

The scintillator protection layer 106 provides a moisture-proof protection function of preventing moisture from externally entering the scintillator layer 105 and an impact protection function of preventing damage to the scintillator layer 105 by impact. If the scintillator layer 105 is made of a scintillator having a columnar crystal structure, the scintillator protection layer 106 has a thickness of 10 to 200 µm. If the thickness of the scintillator protection layer 106 is 10 µm or smaller, it may be impossible to completely cover the uneven surface of the scintillator layer 105 or a large convex portion generated by abnormal growth in deposition, thereby lowering the moisture-proof protection function. On the other hand, if the thickness of the scintillator protection layer 106 is larger than 200 µm, the scattering of light converted by the scintillator layer 105 or reflected by the reflection layer increases in the scintillator protection layer 106. Therefore, the MTF (Modulation Transfer Function) and resolution of an image obtained in the radiation detection apparatus 1 may decrease.

The scintillator panel 109 and sensor panel 110 are adhered to each other by an adhesion layer (adhesion portion) so that the scintillator protection layer 106 and sensor protection layer 114 oppose each other, and are sealed by a sealing portion 120. The sealing portion 120 bonds the edge portion of the sensor panel 110 (sensor base 102 or sensor substrate 112) to that of the scintillator panel 109 (scintillator base 101). The sealing portion 120 includes a first sealing resin 108 having a first elastic modulus, a second sealing resin 117 having a second elastic modulus lower than the first elastic modulus, and a stress reduction portion 116 having a third elastic modulus lower than the second elastic modulus. The stress reduction portion 116 reduces a stress that acts on the first sealing resin 108 and second sealing resin 117 due to a difference in thermal expansion between the scintillator panel 109 and the sensor panel 110.

The practical arrangement of the sealing portion 120 (first sealing resin 108, second sealing resin 117, and stress reduction portion 116) will be explained. For example, the stress reduction portion 116 is arranged on the scintillator base side. As shown in FIG. 1B, the stress reduction portion 116 is bonded to the edge portion of the scintillator base 101 on a second surface 116b on the opposite side (the second substrate member side) to a first surface 116a on the sensor panel side (the first substrate member side) via the scintillator protection layer 106 and base protection layer 104. Furthermore, as shown in FIG. 1B, the stress reduction portion 116 can function as an adhesion layer for adhering the scintillator panel 109 and sensor panel 110 to each other.

Figure 3:
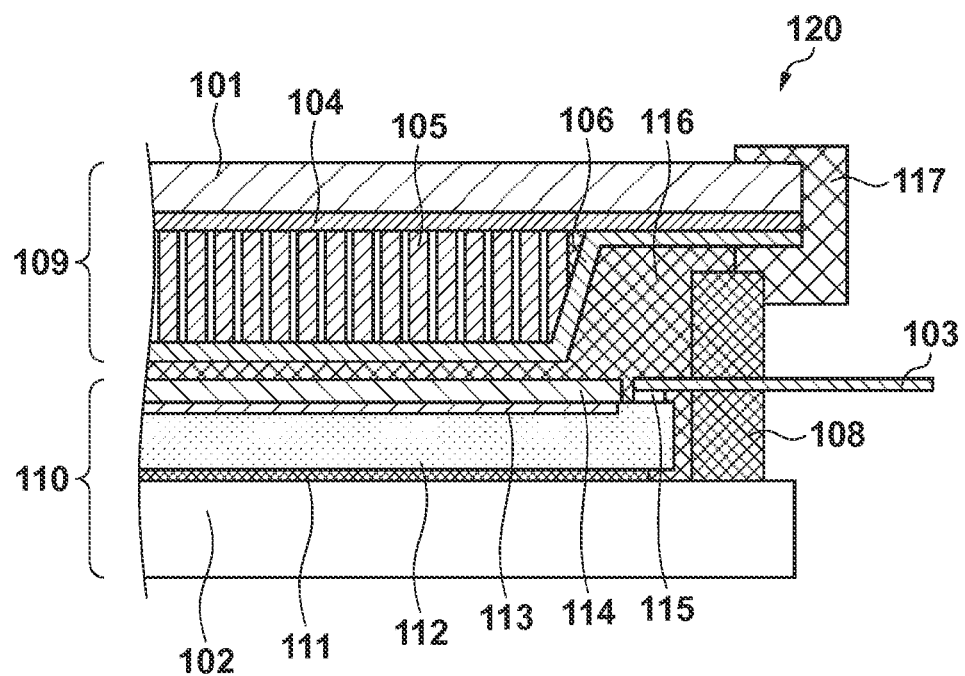
FIG. 3 is a view showing the arrangement of the sealing portion of the radiation detection apparatus shown in FIGS. 1A and 1B.

The stress reduction portion 116 is made of an adhesive resin such as acrylic-, silicone-, rubber-, or polyurethane-based resin. As a rubber-based adhesive resin, a block copolymer-based resin such as a styrene-isoprene-styrene resin, a synthetic rubber-based adhesive such as a polybutadiene or polybutylene adhesive, or a natural rubber-based adhesive can be used. As a silicone-based adhesive resin, a peroxide crosslinking type resin, an addition condensation type resin, or a mixture thereof can be used. Note that a mixture of a silicone-based adhesive resin and acrylic- or rubber-based adhesive resin, or a resin obtaining by bonding, as a pendant, a silicone component to the polymer main or side chain of an acrylic-based adhesive resin may be used for the stress reduction portion 116. Alternatively, as shown in FIG. 3, matching oil, more specifically, hydrophobic oil which reduces a difference in refractive index between a plurality of members, such as a silicone or epoxy resin may be used as the stress reduction portion 116.

The first sealing resin 108 bonds the edge portion of the sensor panel 110 to the first surface 116a on the sensor panel side (first substrate member side) of the stress reduction portion 116. The first sealing resin 108 has, for example, a width of 2 mm or larger on a surface perpendicular to the upper surface of the sensor base 102 (sensor substrate 112). To improve the moisture resistance of the scintillator panel 109, the first sealing resin 108 is preferably made of a resin having low moisture permeability, specifically, an epoxy resin, similarly to the scintillator protection layer 106. A silicone- or acrylic-based resin has an elastic force smaller than that of an epoxy resin, and can thus flexibly cope with a stress due to a difference in thermal expansion between the scintillator panel 109 and the sensor panel 110, but is inferior in moisture resistance.

Figure 4:
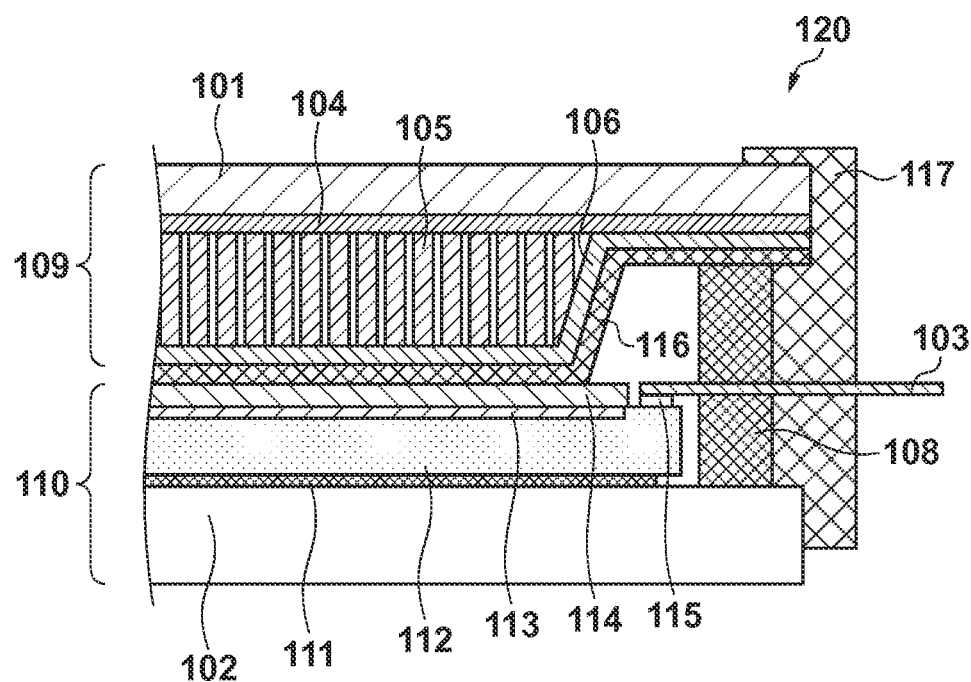
FIG. 4 is a view showing the arrangement of the sealing portion of the radiation detection apparatus shown in FIGS. 1A and 1B.

As shown in FIG. 1B, the second sealing resin 117 bonds the edge portion of the scintillator panel 109 to the first sealing resin 108 to cover a side surface 116c between the first surface 116a and second surface 116b of the stress reduction portion 116. The second sealing resin 117 has, for example, a width of 1 mm or larger on a surface parallel to the upper surface of the sensor base 102 (sensor substrate 112). Furthermore, the second sealing resin 117 may be arranged to contact the entire side surface of the first sealing resin 108 and the sensor base 102 (sensor substrate 112), as shown in FIG. 4, instead of partially contacting the side surface of the first sealing resin 108 (see FIG. 1B).

The second sealing resin 117 has a function of improving the moisture resistance of the scintillator panel 109, similarly to the first sealing resin 108. Note that to complement the function by the stress reduction portion 116, it is necessary to enlarge the stress reduction portion 116 outside the apparatus to obtain the moisture resistance, which may cause interference with other members and an increase in size of the apparatus. To avoid this problem, in this embodiment, the first sealing resin 108 is formed to have an elastic modulus and moisture resistance ratio higher than those of the second sealing resin 117 and those of the stress reduction portion 116.

As described above, by providing the stress reduction portion 116 in the radiation detection apparatus 1, it is possible to reduce a stress that acts on the first sealing resin 108 and second sealing resin 117 due to a difference in thermal expansion between the scintillator panel 109 and the sensor panel 110. Therefore, the radiation detection apparatus 1 can prevent damage to (cracking or peeling of) the first sealing resin 108 and second sealing resin 117 while improving the moisture resistance of the scintillator layer 105. Note that the radiation detection apparatus 1 can also prevent its size from increasing.

In FIG. 1B, the stress reduction portion 116 is caused to function as an adhesion layer for adhering the scintillator panel 109 and sensor panel 110 to each other. Note that as shown in FIG. 5A, the stress reduction portion 116 and an adhesion layer 107 for adhering the scintillator panel 109 and sensor panel 110 to each other may be formed independently of each other. Even if the stress reduction portion 116 and adhesion layer 107 are formed independently of each other, matching oil can be used as the stress reduction portion 116, as shown in FIG. 5B.

Figure 6A:
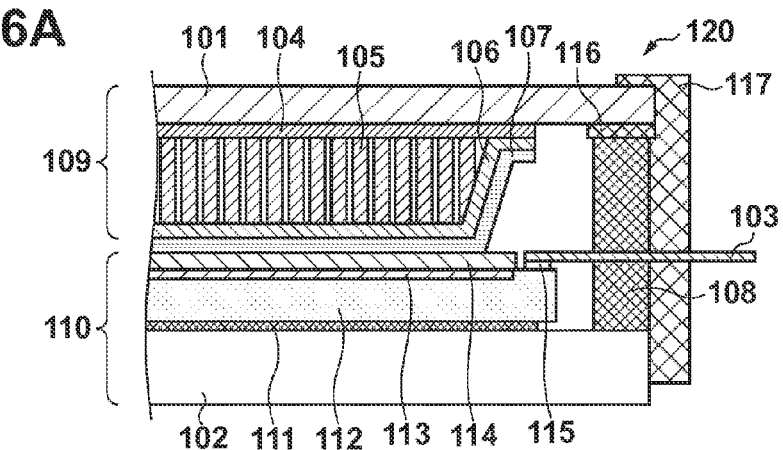
FIGS. 6A to 6C are views each showing the arrangement of the sealing portion of the radiation detection apparatus shown in FIGS. 1A and 1B.

The second sealing resin 117 may be arranged to contact the entire side surface of the first sealing resin 108 and the sensor base 102 (sensor substrate 112), as shown in FIG. 6A, instead of partially contacting the side surface of the first sealing resin 108 (see FIG. 5A).

Figure 6B:
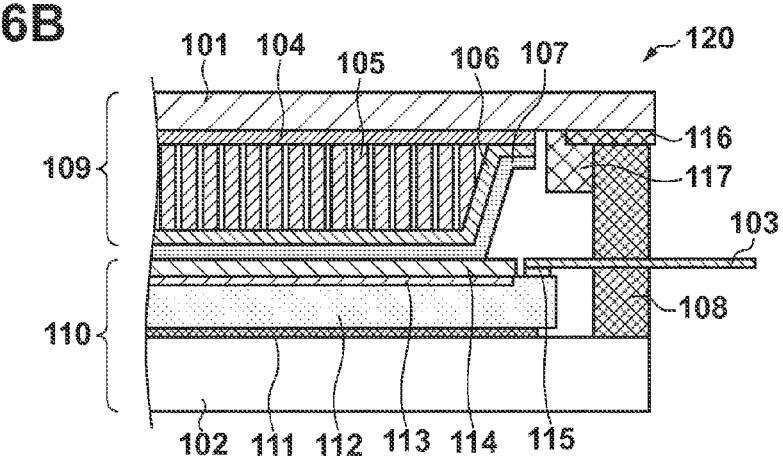
Figure 6C:
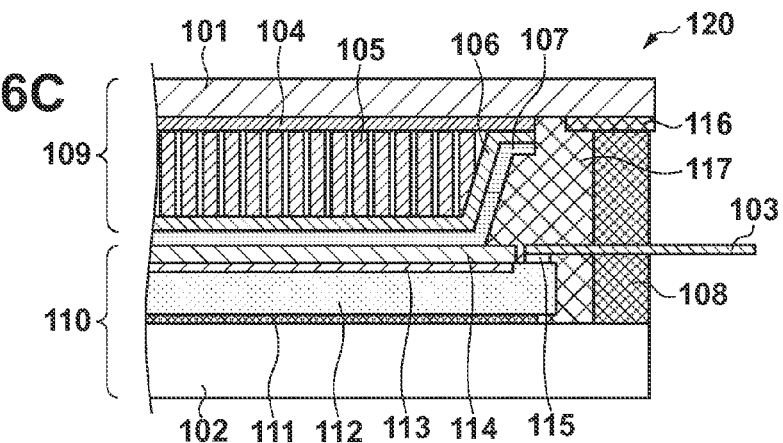

The second sealing resin 117 may be arranged to cover the stress reduction portion 116 from the outside, as shown in FIGS. 5A and 5B, or may be arranged to cover the stress reduction portion 116 from the inside, as shown in FIG. 6B. In other words, the second sealing resin 117 may be arranged on the scintillator layer side to be spaced apart from the scintillator layer 105. Furthermore, as shown in FIG. 6C, the interior between the scintillator layer 105 and the first sealing resin 108 and stress reduction portion 116 may be sealed by the second sealing resin 117. This can improve the strength of the scintillator panel 109. Furthermore, the wiring leads 115 are also covered by the second sealing resin 117, thereby reducing noise.

Figure 7A:
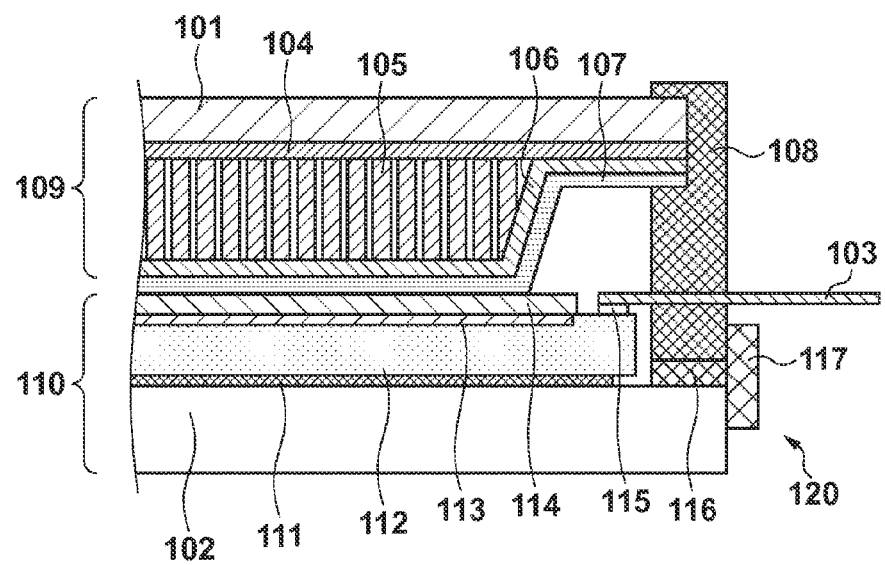
FIGS. 7A and 7B are views each showing the arrangement of the sealing portion of the radiation detection apparatus shown in FIGS. 1A and 1B.
Figure 7B:
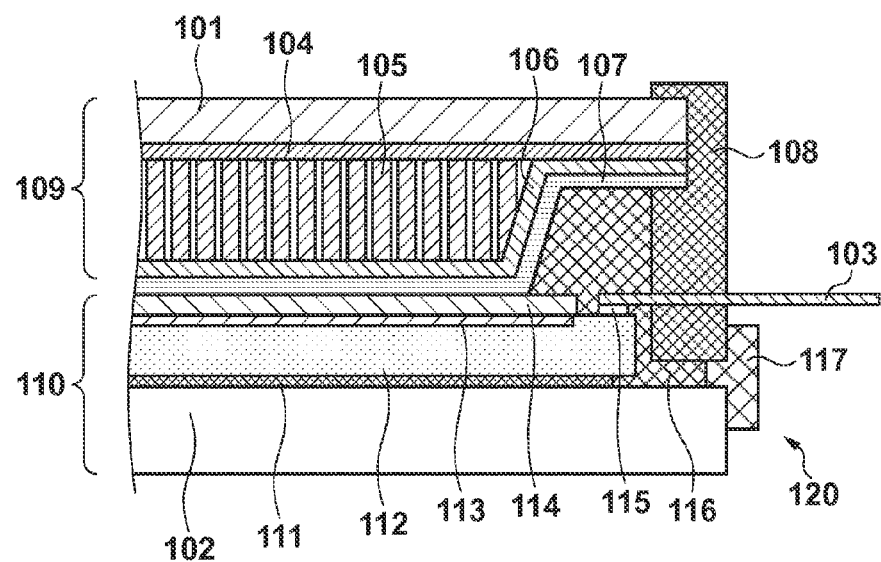

The stress reduction portion 116 may be arranged on the sensor base side (sensor panel side), as shown in FIG. 7A, instead of the scintillator base side. In other words, the stress reduction portion 116 is arranged to contact (be bonded to) one of the scintillator base 101 and sensor base 102 and not to contact the other. If the stress reduction portion 116 is arranged on the sensor base side, it is also possible to use matching oil as the stress reduction portion 116, as shown in FIG. 7B. In this case, as shown in FIG. 8A, matching oil may be used as the stress reduction portion 116, instead of the adhesion layer 107 for adhering the scintillator panel 109 and sensor panel 110 to each other.

Figure 8A:
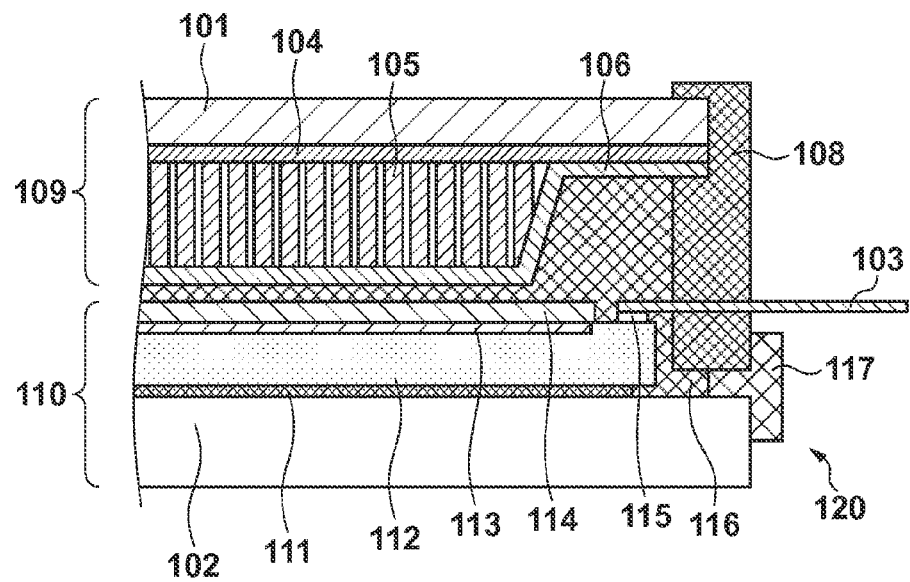
FIGS. 8A and 8B are views each showing the arrangement of the sealing portion of the radiation detection apparatus shown in FIGS. 1A and 1B.
Figure 8B:
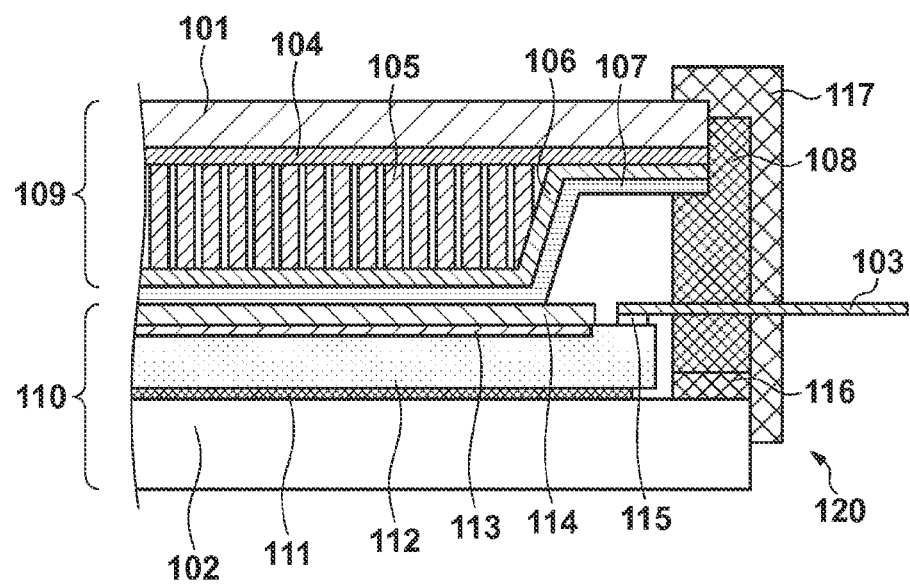

The second sealing resin 117 may be arranged to contact the entire side surface of the first sealing resin 108 and the scintillator base 101, as shown in FIG. 8B, instead of partially contacting the side surface of the first sealing resin 108 (see FIG. 7A).

Figure 9A:
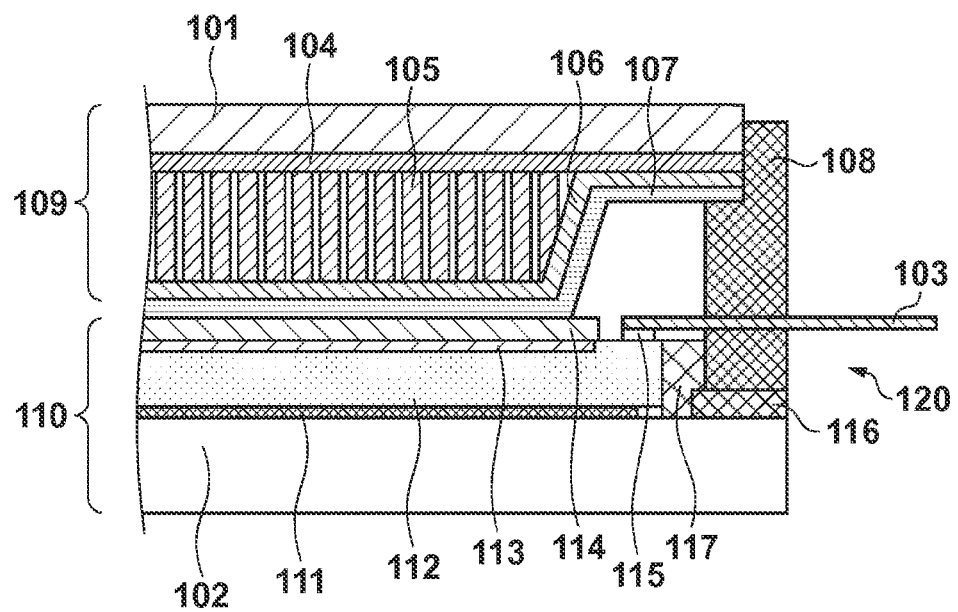
FIGS. 9A and 9B are views each showing the arrangement of the sealing portion of the radiation detection apparatus shown in FIGS. 1A and 1B.
Figure 9B:
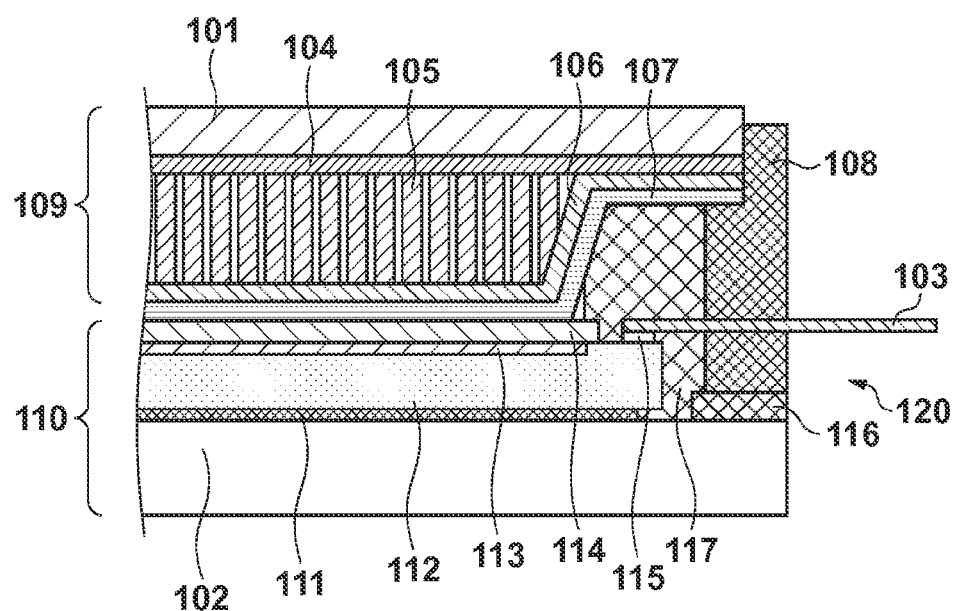

The second sealing resin 117 may be arranged to cover the stress reduction portion 116 from the outside, as shown in FIGS. 8A and 8B, or may be arranged to cover the stress reduction portion 116 from the inside, as shown in FIG. 9A. Furthermore, as shown in FIG. 9B, the interior between the scintillator layer 105 and the first sealing resin 108 and stress reduction portion 116 may be sealed by the second sealing resin 117. This can improve the strength of the scintillator panel 109. Furthermore, the wiring leads 115 are also covered by the second sealing resin 117, thereby reducing noise.

Figure 10:
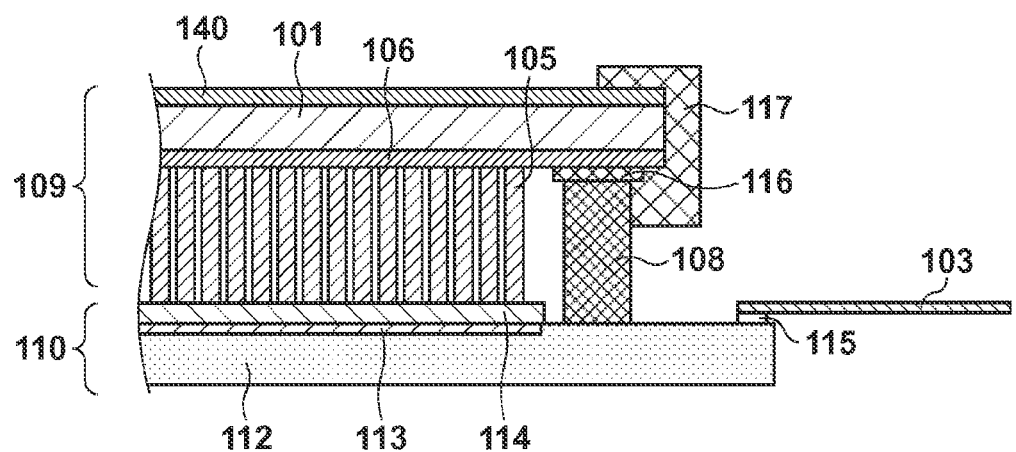
FIG. 10 is a view showing another arrangement of the scintillator panel of the radiation detection apparatus shown in FIGS. 1A and 1B.

As shown in FIG. 10, a reflection protection layer 140 may be arranged (deposited) on the scintillator base 101 functioning as a reflection layer. The reflection protection layer 140 has a function of preventing destruction of the scintillator base 101 by impact or corrosion of the scintillator base 101 due to humidity, and is formed by, for example, a resin film. It is possible to use polyethylene terephthalate, polycarbonate, vinyl chloride, polyethylene naphthalate, or polyimide as a material for the reflection protection layer 140. The reflection protection layer 140 has a thickness of 10 μm to 100 μm. As described above, in FIG. 10, the scintillator base 101, scintillator layer 105, scintillator protection layer 106, and reflection protection layer 140 constitute the scintillator panel 109.

The practical characteristics of the radiation detection apparatus 1 according to the present invention will be described below by comparing with the conventional radiation detection apparatus.

Comparative Example 1

Figure 11:
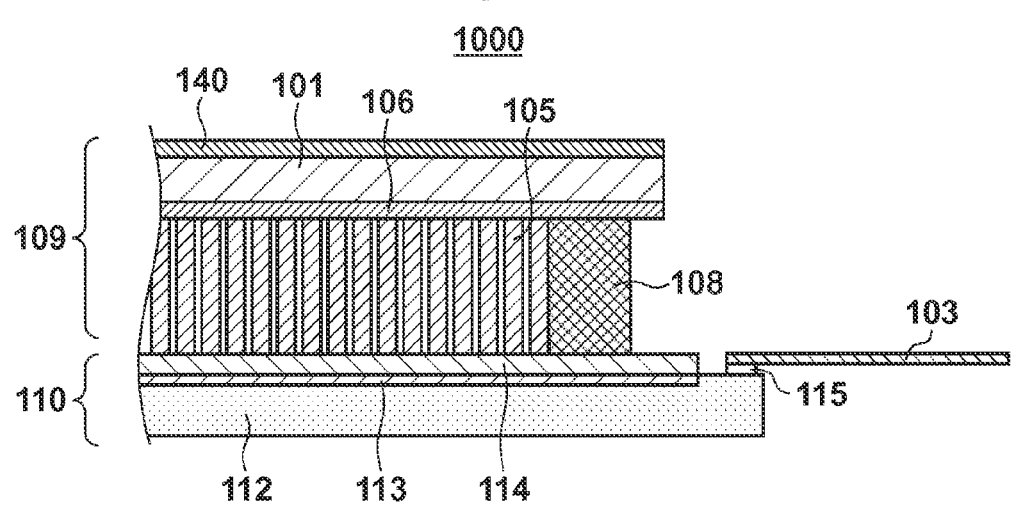
FIG. 11 is a schematic cross-sectional view showing the arrangement of a radiation detection apparatus according to Comparative Example 1.

FIG. 11 is a schematic cross-sectional view showing the arrangement of a radiation detection apparatus 1000 according to Comparative Example 1. Unlike the radiation detection apparatus 1, in the radiation detection apparatus 1000, only a first sealing resin 108 bonds the edge portion of a sensor panel 110 to that of a scintillator panel 109 without using the stress reduction portion 116 or second sealing resin 117, as shown in FIG. 11.

A method of manufacturing the radiation detection apparatus 1000 will be described with reference to FIG. 11. A photoelectric conversion portion 113 including photoelectric conversion elements and TFT switching elements, and wiring leads 115 are formed on a semiconductor thin film made of amorphous silicon, which is formed on a sensor substrate 112 made of, for example, glass. On the photoelectric conversion portion 113, a sensor protection layer 114 made of $SiN_x$ is formed and then a scintillator underlayer (not shown) is formed by curing a polyimide resin, thereby manufacturing the sensor panel 110.

A frame body made of an epoxy resin is formed as the first sealing resin 108 on the scintillator underlayer. More specifically, a dispensing device applies and cures an epoxy resin with a width of 2 mm and a height of 0.5 mm so as to surround the two-dimensionally arrayed photoelectric conversion portion 113 on the sensor substrate 112. A scintillator layer 105 made of an alkali halide and having a columnar crystal structure (for example, CsI:Tl (thallium doped cesium iodide)) is formed (deposited) on the scintillator underlayer. At this time, a holder portion (mask member) functioning as a masking portion is arranged on a non-scintillator layer forming surface such as the wiring leads 115 so as to tightly contact the first sealing resin 108 on the sensor substrate 112, thereby forming the scintillator layer 105. The scintillator layer 105 having a thickness of 0.5 mm is formed to cover the upper surface of the two-dimensionally arrayed photoelectric conversion portion 113, to contact the side surface of the first sealing resin 108, and to have the same height as that of the first sealing resin 108.

Furthermore, a three-layer film-like sheet obtained by adhering, by a heat roller, a reflection protection layer 140 made of polyethylene terephthalate, a scintillator base 101 on which an Al film is formed as a reflection layer, and a scintillator protection layer 106 made of a polyolefin resin is formed. The three-layer film-like sheet is arranged to cover the upper surface of the scintillator layer 105 and first sealing resin 108, and is fixed by heating and pressing by the heat roller.

Humidity tolerance test was performed for the thus manufactured radiation detection apparatus 1000. More specifically, after the radiation detection apparatus 1000 was left to stand for 240 hours in an environment of a temperature of 55° C. and a humidity of 95%, the MTF (Modulation Transfer Function) of the radiation detection apparatus 1000 was measured, thereby evaluating the MTF before and after the humidity tolerance test.

An MTF evaluation method was as follows. First, the radiation detection apparatus 1000 was set on an evaluation apparatus, and an Al filter having a thickness of 20 mm for soft X-ray removal was set between an X-ray source and the apparatus. The distance between the radiation detection apparatus 1000 and the X-ray source was adjusted to 130 cm, and the radiation detection apparatus 1000 was connected to an electric driving system. In this state, an MTF chart was mounted on the radiation detection apparatus 1000 at a tilt angle of about 2° to 3°, and 50-ms X-ray pulses were applied to the apparatus six times under the condition of a tube voltage of 90 kV and a tube current of 250 mA. The MTF chart was then removed, and X-ray pulses were applied to the apparatus six times under the same condition.

In the radiation detection apparatus 1000, the humidity tolerance test in the environment of a temperature of 55° C. and a humidity of 95% decreased the MTF of the edge portion of the scintillator layer 105 by 30% as compared with that before the humidity tolerance test.

A temperature cycle test was performed for the radiation detection apparatus 1000. The temperature cycle test was as follows. The radiation detection apparatus 1000 was set on the evaluation apparatus. Processing in which the radiation detection apparatus 1000 was left for four hours in an environment of a temperature of 50° C. and a humidity of 60%, and was then left to stand for four hours in an environment of a temperature of 30° C. and a humidity of 0% was repeated five times. The first sealing resin 108 was visually evaluated for damage (crack or flake off) due to a difference in thermal expansion between the scintillator panel 109 and the sensor panel 110. In the radiation detection apparatus 1000, the first sealing resin 108 had not been damaged.

Comparative Example 2

Figure 12:
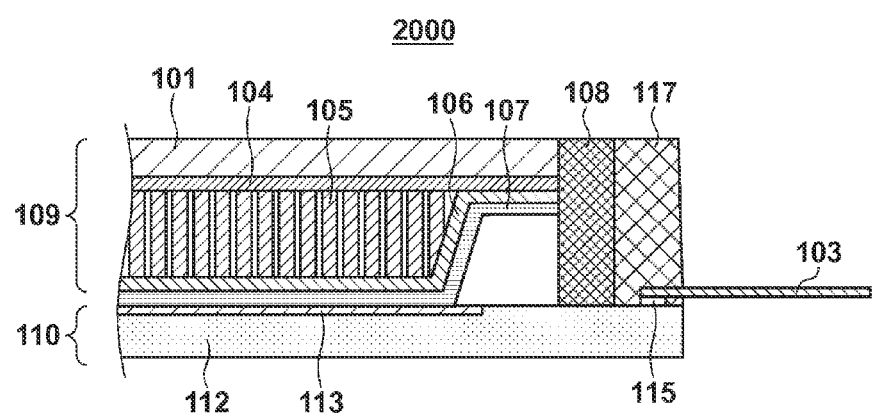
FIG. 12 is a schematic cross-sectional view showing the arrangement of a radiation detection apparatus according to Comparative Example 2.

FIG. 12 is a schematic cross-sectional view showing the arrangement of a radiation detection apparatus 2000 according to Comparative Example 2. Unlike the radiation detection apparatus 1, in the radiation detection apparatus 2000, a first sealing resin 108 and a second sealing resin 117 bond the edge portion of a sensor panel 110 to that of a scintillator panel 109 without using the stress reduction portion 116, as shown in FIG. 12.

A method of manufacturing the conventional radiation detection apparatus 2000 will be described with reference to FIG. 12. A polyimide resin is applied to a scintillator base 101 made of aluminum, and cured, thereby forming a base protection layer 104. A scintillator layer 105 having a columnar crystal structure is then formed on the base protection layer 104, similarly to Comparative Example 1.

A scintillator protection layer 106 made of polyethylene terephthalate is formed on the scintillator layer 105 by thermocompression bonding so as to cover the scintillator layer 105. Note that a polyethylene terephthalate film having a thickness of 15 μm is used as the scintillator protection layer 106.

With those processes, the scintillator panel 109 including the scintillator layer 105 for converting radiation into light with a wavelength detectable by photoelectric conversion elements is formed.

The scintillator panel 109 is adhered to the sensor panel 110 via an adhesion layer 107 made of an acrylic-based resin. A sensor panel 110 is formed by forming a photoelectric conversion portion 113 on a sensor substrate 112. Bubbles generated when adhering the scintillator panel 109 and sensor panel 110 are removed by performing defoaming processing such as the application of pressure or heat.

External wiring lines 103 undergo thermocompression bonding to wiring leads 115 on the sensor substrate 112. A first sealing resin 108 of a silicone-based resin is formed at the edge portion of the scintillator base 101 and that of the sensor substrate 112. Furthermore, a second sealing resin 117 of an epoxy-based resin having high moisture resistance is formed to contact the side surface (outside surface) of the first sealing resin 108.

The above-described humidity tolerance test was performed for the thus manufactured radiation detection apparatus 2000. In the radiation detection apparatus 2000, the humidity tolerance test in an environment of a temperature of 55° C. and a humidity of 95% suddenly decreased the MTF of the edge portion of the scintillator layer 105.

Comparative Example 3

Figure 13:
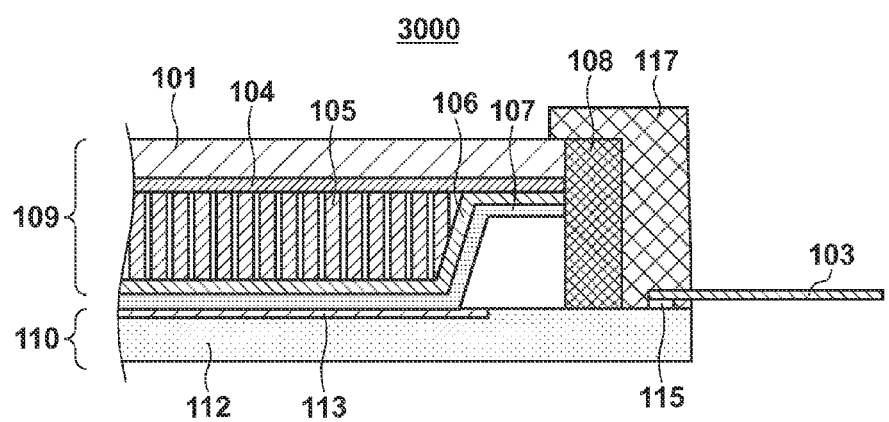
FIG. 13 is a schematic cross-sectional view showing the arrangement of a radiation detection apparatus according to Comparative Example 3.

FIG. 13 is a schematic cross-sectional view showing the arrangement of a radiation detection apparatus 3000 according to Comparative Example 3. The radiation detection apparatus 3000 is manufactured, similarly to the radiation detection apparatus 2000. Note that in the radiation detection apparatus 3000, a second sealing resin 117 is formed to contact the edge portion of a scintillator base 101 and that of a sensor substrate 112.

The above-described humidity tolerance test and temperature cycle test were performed for the radiation detection apparatus 3000. In the humidity tolerance test performed for the radiation detection apparatus 3000 in an environment of a temperature of 55° C. and a humidity of 95%, a decrease in MTF of the edge portion of a scintillator layer 105 was 10% or lower. However, a first sealing resin 108 and the second sealing resin 117 were damaged in the temperature cycle test.

Example 1

Similarly to Comparative Example 2, a scintillator panel 109 and a sensor panel 110 are formed. A stress reduction portion 116 which is formed by MO3005C available from Lintec and functions as an adhesion layer adheres the scintillator panel 109 and sensor panel 110 to each other, as shown in FIG. 1B.

A first sealing resin 108 is applied and cured between the stress reduction portion 116 and a sensor base 102. At that time, the first sealing resin 108 is applied not to contact a scintillator base 101. This can prevent damage to (cracking or peeling of) the first sealing resin 108 and a second sealing resin 117 by a difference in thermal expansion between the scintillator panel 109 and the sensor panel 110.

The second sealing resin 117 is then applied and cured to cover the side surface of the stress reduction portion 116 and to contact the edge portion of the scintillator base 101 and the first sealing resin 108.

As described above, the first sealing resin 108 is bonded to the scintillator base 101 via the stress reduction portion 116, and the second sealing resin 117 was formed to cover the stress reduction portion 116, thereby manufacturing the radiation detection apparatus 1.

As shown in FIG. 2, a photoelectric conversion portion 113 is arranged on an insulating sensor substrate 112 made of, for example, glass to form a sensor panel 110, thereby manufacturing another radiation detection apparatus 1 in the same manner as that described above.

As shown in FIG. 3, still another radiation detection apparatus 1 is manufactured using matching oil as the stress reduction portion 116. More specifically, a first sealing resin 108 is formed on a sensor base 102, and silicone-based matching oil is filled in a region covered by the first sealing resin 108 and on the first sealing resin 108. A sensor panel 110 is laminated on a scintillator panel 109, and the edge portion of the scintillator panel 109 and the first sealing resin 108 are bonded by a second sealing resin 117. To do this, the second sealing resin 117 is formed to contact the scintillator base 101 and first sealing resin 108.

As shown in FIG. 4, still another radiation detection apparatus 1 is manufactured by forming a second sealing resin 117 to contact the entire side surface of a first sealing resin 108 and a sensor base 102 (sensor substrate 112).

The above-described humidity tolerance test and temperature cycle test were performed for the thus manufactured radiation detection apparatuses 1. In the humidity tolerance test performed for the radiation detection apparatuses 1 in an environment of a temperature of 55° C. and a humidity of 95%, a decrease in MTF of the edge portion of the scintillator layer 105 met the standard. There was no damage to the first sealing resin 108 or second sealing resin 117 in the temperature cycle test.

Example 2

As shown in FIG. 5A, a stress reduction portion 116 and an adhesion layer 107 for adhering a scintillator panel 109 and sensor panel 110 to each other are formed independently of each other, thereby manufacturing a radiation detection apparatus 1. More specifically, in forming the scintillator panel 109 similarly to Example 1, a base protection layer 104, a scintillator protection layer 106, and the adhesion layer 107 are formed so that the edge portion of a scintillator base 101 is exposed. A stress reduction portion 116 formed by MO3005C available from Lintec is formed in the edge portion of the scintillator base 101, and adhered the scintillator panel 109 and sensor panel 110 to each other. A first sealing resin 108 is applied and cured between the stress reduction portion 116 and a sensor base 102. A second sealing resin 117 is then applied and cured to cover the side surface of the stress reduction portion 116 and to contact the edge portion of the scintillator base 101 and the first sealing resin 108.

As shown in FIG. 5B, another radiation detection apparatus 1 is manufactured using matching oil as the stress reduction portion 116. More specifically, a scintillator panel 109 and sensor panel 110 are adhered to each other similarly to Example 1, and silicone-based matching oil is filled to form a first sealing resin 108 and second sealing resin 117 in the order named.

As shown in FIG. 6A, still another radiation detection apparatus 1 is manufactured by forming a second sealing resin 117 to contact the entire side surface of a first sealing resin 108 and a sensor base 102 (a sensor substrate 112).

As shown in FIG. 6B, still another radiation detection apparatus 1 is manufactured by forming a second sealing resin 117 to cover a stress reduction portion 116 from the inside. More specifically, after a scintillator panel 109 and sensor panel 110 are adhered to each other similarly to Example 1, a stress reduction portion 116 is formed. A second sealing resin 117 is then formed to contact the side surface (inside surface) of the stress reduction portion 116 and the edge portion of a scintillator base 101. A first sealing resin 108 was formed to contact the stress reduction portion 116, second sealing resin 117, and scintillator base 101.

As shown in FIG. 6C, still another radiation detection apparatus 1 is manufactured by sealing the interior between a scintillator layer 105 and a first sealing resin 108 and stress reduction portion 116 by a second sealing resin 117. More specifically, after a scintillator panel 109 and sensor panel 110 are adhered to each other similarly to Example 1, a stress reduction portion 116 is formed. A second sealing resin 117 is formed to contact a scintillator base 101, sensor base 102, and stress reduction portion 116. A first sealing resin 108 is then formed to contact the stress reduction portion 116, second sealing resin 117, and scintillator base 101.

The above-described humidity tolerance test and temperature cycle test were performed for the thus manufactured radiation detection apparatuses 1. In the humidity tolerance test performed for the radiation detection apparatuses 1 in an environment of a temperature of 55° C. and a humidity of 95%, a decrease in MTF of the edge portion of the scintillator layer 105 met the standard. There was no damage to the first sealing resin 108 or the second sealing resin 117 in the temperature cycle test.

Example 3

As shown in FIG. 7A, a radiation detection apparatus 1 is manufactured by forming a stress reduction portion 116 on the sensor base side (sensor panel side). More specifically, a scintillator panel 109 and sensor panel 110 are formed, similarly to Example 1. The stress reduction portion 116 is formed on a sensor base 102 of the sensor panel 110, and adheres the scintillator panel 109 and sensor panel 110 to each other. In this case, an adhesion layer 107 functions as not the stress reduction portion 116 but an adhesion layer for adhering the scintillator panel 109 and sensor panel 110 to each other. A first sealing resin 108 is formed between a scintillator base 101 and the stress reduction portion 116 to contact them. A second sealing resin 117 is then formed to cover the side surface (outside surface) of the stress reduction portion 116 and to contact the edge portion of the sensor base 102 and the first sealing resin 108.

As shown in FIG. 7B, another radiation detection apparatus 1 is manufactured using matching oil as the stress reduction portion 116. More specifically, after a scintillator panel 109 and sensor panel 110 are adhered to each other similarly to Example 1, a first sealing resin 108 is formed not to contact the sensor panel 110. At this time, the first sealing resin 108 is formed not to contact the sensor panel 110 by masking the sensor base 102 and a sensor substrate 112. A second sealing resin 117 is formed by filling silicone-based matching oil between the first sealing resin 108 and the sensor panel 110.

As shown in FIG. 8A, still another radiation detection apparatus 1 is manufactured using matching oil as the stress reduction portion 116 instead of the adhesion layer for adhering the scintillator panel 109 and sensor panel 110 to each other. More specifically, a scintillator panel 109 and sensor panel 110 are formed, similarly to Example 1. The sensor panel 110 is laminated on the scintillator panel 109 by applying silicone-based matching oil to each of the scintillator panel 109 and sensor panel 110. A first sealing resin 108 is formed not to contact the sensor panel 110. A second sealing resin 117 is then formed to contact the sensor panel 110 and first sealing resin 108.

As shown in FIG. 8B, still another radiation detection apparatus 1 is manufactured by forming the second sealing resin 117 to contact the entire side surface of the first sealing resin 108 and the scintillator base 101.

As shown in FIG. 9A, still another radiation detection apparatus 1 is manufactured by forming the second sealing resin 117 to cover the stress reduction portion 116 from the inside. More specifically, after a scintillator panel 109 and sensor panel 110 are adhered to each other similarly to Example 1, a stress reduction portion 116 is formed. A second sealing resin 117 is formed to contact the side surface (inside surface) of the stress reduction portion 116 and the edge portion of the scintillator base 101. A first sealing resin 108 is then formed to contact the stress reduction portion 116, second sealing resin 117, and scintillator base 101.

As shown in FIG. 9B, still another radiation detection apparatus 1 is manufactured by sealing the interior between a scintillator layer 105 and the first sealing resin 108 and stress reduction portion 116 by the second sealing resin 117.

The above-described humidity tolerance test and temperature cycle test were performed for the thus manufactured radiation detection apparatuses 1. In the humidity tolerance test performed for the radiation detection apparatuses 1 in an environment of a temperature of 55° C. and a humidity of 95%, a decrease in MTF of the edge portion of the scintillator layer 105 met the standard. There was no damage to the first sealing resin 108 or the second sealing resin 117 in the temperature cycle test.

Example 4

As shown in FIG. 10, a scintillator layer 105 is deposited on a sensor panel 110, similarly to Comparative Example 1. A first sealing resin 108 is formed on a sensor substrate 112, similarly to Comparative Example 1. A stress reduction portion 116 is formed on the first sealing resin 108. A three-layer film-like sheet obtained by adhering, by a heat roller, a reflection protection layer 140 made of polyethylene terephthalate, a scintillator base 101 on which an Al film is formed as a reflection layer, and a scintillator protection layer 106 made of a polyolefin resin is formed. The three-layer film-like sheet is arranged to cover the upper surface of the scintillator layer 105 and stress reduction portion 116, and is fixed by heating and pressing by the heat roller. A second sealing resin 117 is formed to cover the side surface (outside surface) of the stress reduction portion 116 and to contact the first sealing resin 108 and reflection protection layer 140.

The above-described humidity tolerance test and temperature cycle test were performed for the thus manufactured radiation detection apparatus 1. In the humidity tolerance test performed for the radiation detection apparatus 1 in an environment of a temperature of 55° C. and a humidity of 95%, a decrease in MTF of the edge portion of the scintillator layer 105 was 5% or lower. There was no damage to the first sealing resin 108 or the second sealing resin 117 in the temperature cycle test.

<Application>

Figure 14:
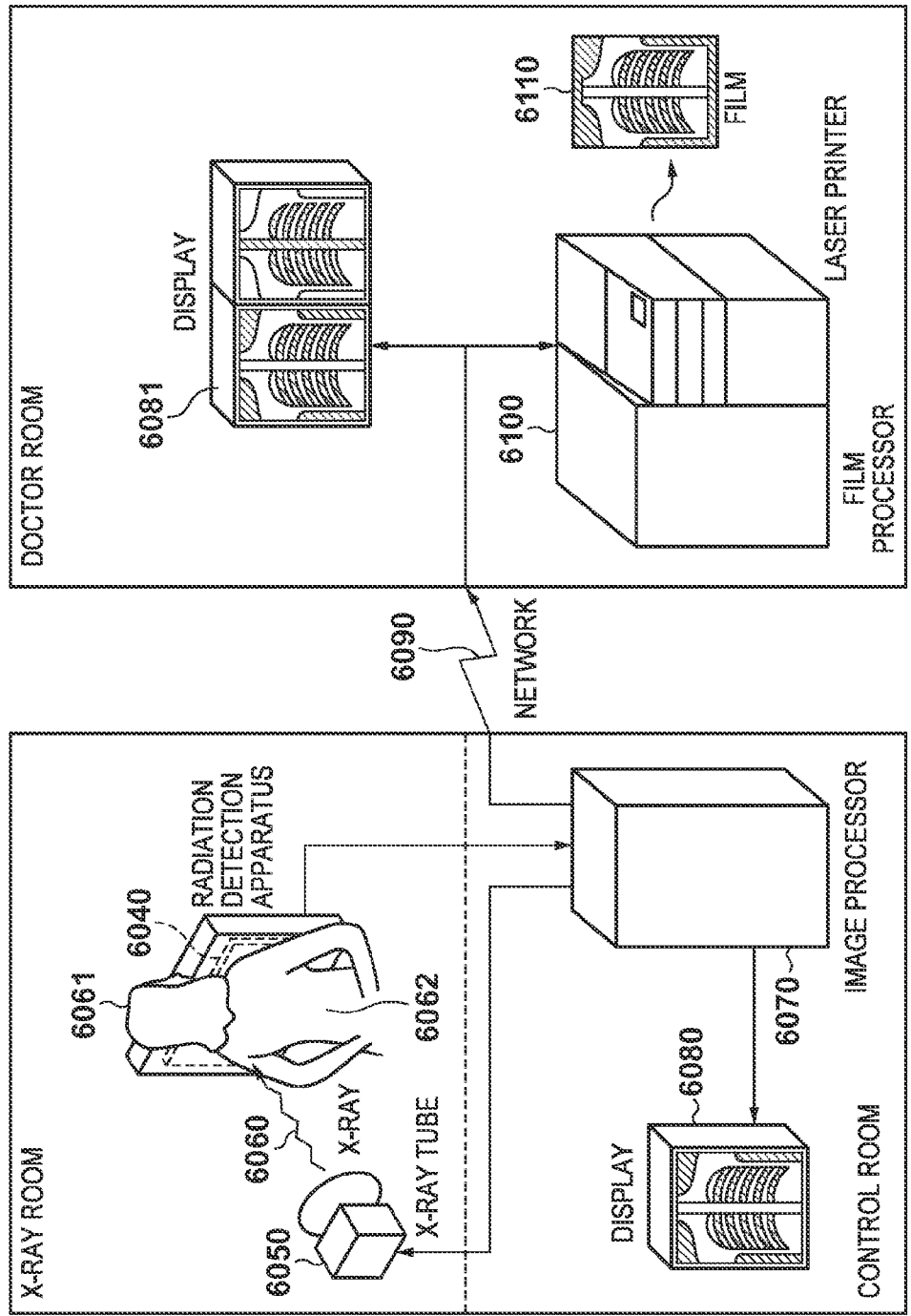
FIG. 14 is a view for explaining a case in which the radiation detection apparatus is applied to a system.

The radiation detection apparatus according to each of the above-described embodiments is applicable to a radiation detection system. The radiation detection system includes, for example, the radiation detection apparatus, a signal processing unit including an image processor, a display unit including a display, and a radiation source for generating radiation. For example, as shown in FIG. 14, X-rays 6060 generated by an X-ray tube 6050 are transmitted through a chest 6062 of a patient (subject) 6061 and enter a radiation detection apparatus 6040. The incident X-rays include information concerning the in-vivo information of the patient 6061. The scintillator emits light in accordance with the incident X-rays. A sensor panel detects this light to obtain electrical information. After that, this information can be digitally converted, undergo image processing by an image processor 6070 (signal processing unit), and then be displayed on a display 6080 (display unit) in a control room. A transmission processing unit including a network 6090 such as a telephone, a LAN, or the Internet can also transfer this information to a remote place. This makes it possible to display the information on a display 6081 in a doctor room or the like in another place and allow a doctor in a remote place to make diagnosis. In addition, the information can be stored in, for example, an optical disk. Alternatively, a film processor 6100 can record the information on a recording unit such as a film 6110.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2012-226326 filed on Oct. 11, 2012, which is hereby incorporated by reference herein in its entirety.

What is claimed is:

1. A radiation detection apparatus comprising:
a first substrate member;
a second substrate member; and
a sealing portion configured to bond an edge portion of the first substrate member to an edge portion of the substrate member,
one of the first substrate member and the second substrate member being a sensor panel including photoelectric conversion elements and the other being a scintillator panel including a scintillator layer, and
the sealing portion including a first sealing resin having a first elastic modulus, a second sealing resin having a second elastic modulus lower than the first elastic modulus, a stress reduction portion configured to reduce a stress that acts on the first sealing resin and the second sealing resin and having a third elastic modulus lower than the second elastic modulus,
wherein the first sealing resin bonds the edge portion of the first substrate member to a first surface of the stress reduction portion on a side of the first substrate member,
the stress reduction portion is bonded to the edge portion of the second substrate member via a second surface on an opposite side to the first surface, and
the second sealing resin bonds the edge portion of the second substrate member to the first sealing resin to cover a side surface between the first surface and the second surface of the stress reduction portion.

2. The apparatus according to claim 1, wherein the first sealing resin has a moisture resistance ratio higher than that of the second sealing resin and that of the stress reduction portion.

3. The apparatus according to claim 1, wherein the stress reduction portion includes an adhesion portion configured to adhere the first substrate member and the second substrate member to each other.

4. The apparatus according to claim 1, wherein the first sealing resin has a width not smaller than 2 mm on a surface parallel to an upper surface of the first substrate member.

5. The apparatus according to claim 1, wherein the second sealing resin has a width not smaller than 1 mm on a surface parallel to an upper surface of the first substrate member.

6. The apparatus according to claim 1, wherein the second sealing resin is spaced apart from the scintillator layer and arranged on a side of the scintillator layer with respect to the first sealing resin.

7. The apparatus according to claim 1, wherein the stress reduction portion includes matching oil.

8. The apparatus according to claim 1, wherein the first sealing resin and the second sealing resin contain epoxy as a principal component.

9. The apparatus according to claim 1, wherein the scintillator layer contains cesium iodide as a principal component.

10. The apparatus according to claim 1, wherein the scintillator panel includes a substrate made of at least one of beryllium, aluminum, magnesium, and an alloy containing beryllium, aluminum, or magnesium as a principal component.

11. A radiation detection system comprising:
a radiation detection apparatus according to claim 1;
a signal processing unit configured to process a signal from the radiation detection apparatus; and
a display unit configured to display a signal from the signal processing unit.

* * * * *